(12) United States Patent
Ruth et al.

(10) Patent No.: US 8,818,593 B2
(45) Date of Patent: *Aug. 26, 2014

(54) TROLLEY DRIVEN MACHINE RECORD AND PLAYBACK AUTOMATION

(75) Inventors: Eric J Ruth, Peoria, IL (US); Ken L Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/452,925

(22) Filed: Apr. 22, 2012

(65) Prior Publication Data

US 2013/0282211 A1    Oct. 24, 2013

(51) Int. Cl.
*B60L 9/00* (2006.01)
*G08G 1/16* (2006.01)

(52) U.S. Cl.
USPC ............................................. 701/22; 701/301

(58) Field of Classification Search
USPC .......................................................... 701/22
See application file for complete search history.

(56) References Cited

U.S. PATENT DOCUMENTS

| | | | |
|---|---|---|---|
| 4,745,997 A | 5/1988 | Takei et al. | |
| 4,986,384 A | 1/1991 | Okamoto et al. | |
| 5,007,496 A | 4/1991 | Whitten et al. | |
| 5,293,947 A | 3/1994 | Stratton | |
| 5,490,075 A | 2/1996 | Howard et al. | |
| 7,076,346 B2 | 7/2006 | Sturges et al. | |
| 7,409,295 B2 * | 8/2008 | Paradie | 701/301 |
| 7,475,997 B2 | 1/2009 | Fujiwara et al. | |
| 2003/0178883 A1 | 9/2003 | Hinds et al. | |
| 2010/0065356 A1 | 3/2010 | Reddy et al. | |
| 2010/0198466 A1 | 8/2010 | Eklund et al. | |
| 2010/0270983 A1 | 10/2010 | Gong et al. | |
| 2013/0126250 A1 * | 5/2013 | Ruth | 180/2.1 |
| 2013/0126251 A1 * | 5/2013 | Ruth | 180/2.1 |
| 2013/0144472 A1 * | 6/2013 | Ruth et al. | 701/22 |

FOREIGN PATENT DOCUMENTS

| | | | | |
|---|---|---|---|---|
| DE | 19907516 A1 | 9/2000 | | |
| DE | 10256705 A1 | 7/2004 | | |
| DE | 102 56 705 B4 | 2/2007 | | |
| EP | 1121245 | 12/2008 | | |
| JP | 05076101 A * | 3/1993 | | B60L 5/08 |
| JP | 06113403 A * | 4/1994 | | B60L 5/24 |
| JP | 2008018831 A * | 1/2008 | | |
| JP | 2010071706 A * | 4/2010 | | |
| JP | 2010074899 A * | 4/2010 | | |
| JP | 2010183771 | 8/2010 | | |
| JP | 2010183771 A * | 8/2010 | | |
| JP | 2010183802 A * | 8/2010 | | |
| JP | 2012239268 A * | 12/2012 | | |
| JP | 2013009515 A * | 1/2013 | | |
| WO | 2009007879 | 1/2009 | | |
| WO | WO 2010032695 A1 * | 3/2010 | | B60L 5/26 |

* cited by examiner

*Primary Examiner* — John R Olszewski
*Assistant Examiner* — Jean-Paul Cass
(74) *Attorney, Agent, or Firm* — Miller, Matthias & Hull; Jeff A. Greene

(57) ABSTRACT

A system and method for automatically guiding an off-highway truck having a pantograph over a route having at least one trolley-powered section. While the off-highway truck is operated over the route by a human operator, its position and the state of the pantograph at each position are recorded to produce a recorded sequence. The recorded sequence is retrieved and the off-highway truck is automatically controlled to sequentially match each position and each pantograph state at the associated position.

21 Claims, 7 Drawing Sheets

| Time | Location | | Pant. | Speed |
|---|---|---|---|---|
| | Lat. | Lon. | | |
| $t_1$ | $x_1$ | $y_1$ | U | $S_1$ |
| $t_2$ | $x_2$ | $y_2$ | U | $S_2$ |
| $t_3$ | $x_3$ | $y_3$ | U | $S_3$ |
| $t_4$ | $x_4$ | $y_4$ | U | $S_4$ |
| $t_5$ | $x_5$ | $y_5$ | U | $S_5$ |
| $t_6$ | | | U | |

FIG. 4

TROLLEY DRIVEN MACHINE RECORD AND PLAYBACK AUTOMATION

TECHNICAL FIELD OF THE DISCLOSURE

The present disclosure relates to guidance of trolley-driven machines and, more particularly, relates to a system for operating a trolley-driven machine by operation recording and playback.

BACKGROUND OF THE DISCLOSURE

Although electric power has many benefits for use in industrial material transport machinery, some of these benefits may be offset by the need to carry, charge and maintain a sufficient source of electric power, e.g., a large battery or other charge storage system. In applications having substantially repeated travel patterns, such as in mine work and other similar contexts, trolley line systems eliminate this problem by providing a path along which a travelling machine may receive electric power from one or more power lines (herein referred to as "trolley lines"). Such trolley lines may be placed continuously along a path, or only at certain portions of the path, such as uphill runs, to provide assist power.

In a trolley system, the source of electrical power, which may be a municipal grid or an on-site generator facility, stays fixed, but the trolley-powered machine nonetheless receives power from the power source anywhere along the trolley lines. As such, the efficiencies of electric power may be obtained when needed without the concomitant complications and expense of large batteries. However, one significant limitation of trolley systems is that the trolley-powered machine must track the trolley lines if it is to receive power there from. In a related vein, the apparatus for electrically connecting the trolley-powered machine to the trolley lines, called a "pantograph," must be raised when the trolley line is to be used, and lowered at other times.

Taking into account the above requirements, the use of a trolley system requires the machine operator to both follow the trolley line accurately and to raise and lower the pantograph at the appropriate locations. Failure to meet either requirement can result in a loss of efficiency, since alternative power such as an onboard engine must be used when the trolley-powered machine is not receiving power from the trolley line. Moreover, misdirection of the machine or the pantograph can result in damage to the machine as well as to the trolley line and associated infrastructure, e.g., lines, line poles, transformers, etc.

While various aides have been developed to assist the operator in following the trolley line and appropriately raising and lowering the pantograph, the chore of operating the machine remains one that encourages fatigue and distraction for the operator. Certain systems have been developed to automate some types of industrial machine operation, but such solutions do not address numerous important problems present in the context of a trolley-driven machine. For example, U.S. Pat. No. 6,195,610 by Kaneko, entitled "Teaching Method and Apparatus and Unmanned Vehicle Travelling Course" (hereinafter "Kaneko") discloses dividing a course into zones and conducting a teaching process for each zone. However, there is no accommodation in Kaneko for an operator and the actions of the operator once a machine is in the automatic mode. Indeed, course corrections when in automatic mode must be made by the system and not the operator as noted at Kaneko 15:20 et seq. (" . . . When the dump truck 3 further travels automatically by dead reckoning, and passes by the other one of the aforementioned pair of correcting poles 4, the controller 20 obtains the distance . . . Thereby the current position and the traveling direction which are computed by dead reckoning are corrected, and automatic traveling by dead reckoning is conducted thereafter in the same way as in the above."). Moreover, the unmanned machines of Kaneko are not trolley-powered, and so there is no disclosure of a system to accommodate the lateral location, starting location and stopping locations of trolley lines, and so on.

It will be appreciated that this background section was created by the inventors for the reader's convenience. It is meant to discuss problems and concepts noted by the inventors, and not to discuss or explain prior art unless expressly otherwise noted. Thus the inclusion of any problem or solution in this section is not an indication that the problem or solution is prior art.

SUMMARY OF THE DISCLOSURE

In accordance with one aspect of the present disclosure, a method is provided for automatically guiding an off-highway truck having a pantograph over a route having at least one trolley-powered section. The method entails causing the off-highway truck to be operated over the route, including raising the pantograph to contact one or more trolley lines associated with the trolley-powered section and lowering the pantograph when the off-highway truck is within the trolley-powered section. While the off-highway truck is operated over the route, its position and the state of the pantograph at each position are recorded to produce a recorded sequence. The recorded sequence is retrieved and the off-highway truck is automatically controlled to sequentially match each position and each pantograph state at the associated position.

In accordance with another aspect of the disclosure, a system is provided for automatically guiding an off-highway truck over a route. The off-highway truck includes a pantograph, and the route has at least one trolley-powered section. The system comprises a pantograph actuator for raising and lowering the pantograph, a steering actuator for steering the off-highway truck and a controller. The controller is configured to record a sequence of data including periodic position data and periodic pantograph state data while the off-highway truck is operated over the route by a human operator, and to automatically control the off-highway truck in keeping with the recorded sequence of data via the pantograph actuator and the steering actuator.

In yet another aspect of the disclosure, a method is provided for automating operation of an off-highway truck over a route having a trolley-powered section, the off-highway truck including a pantograph for drawing power to power the off-highway truck from one or more trolley lines associated with the trolley-powered section of the route. The method includes receiving record command from an operator of the off-highway truck and in response, recording a sequence of positions and pantograph states of the off-highway truck while the operator drives the off-highway truck and operates the pantograph. The recorded positions and pantograph states are played back to automatically operate the off-highway truck over the route.

Further features and aspects of the disclosed systems and methods will become apparent from reading the detailed description in conjunction with the attached drawing figures.

BRIEF DESCRIPTION OF THE DRAWINGS

FIG. 4 is a data structure diagram showing a data structure for storing machine data and location in an embodiment of the disclosed principles;

While the present disclosure is susceptible to various modifications and alternative constructions, certain illustrative embodiments thereof will be shown and described below in detail. It should be understood, however, that there is no intention to be limited to the specific embodiments disclosed; on the contrary, the intention is to encompass all modifications, alternative constructions, and equivalents that are within the spirit and scope of the present disclosure.

DETAILED DESCRIPTION OF THE DISCLOSURE

The present disclosure relates to a system and method for guiding an off-highway trolley-driven truck by replaying previous navigational and pantograph operation commands, linked with machine location, to provide steering, speed and trolley line connection guidance. As used herein, the term "trolley line" encompasses a single line or a set of lines, e.g., a pair, used simultaneously by a machine.

Figure 1:
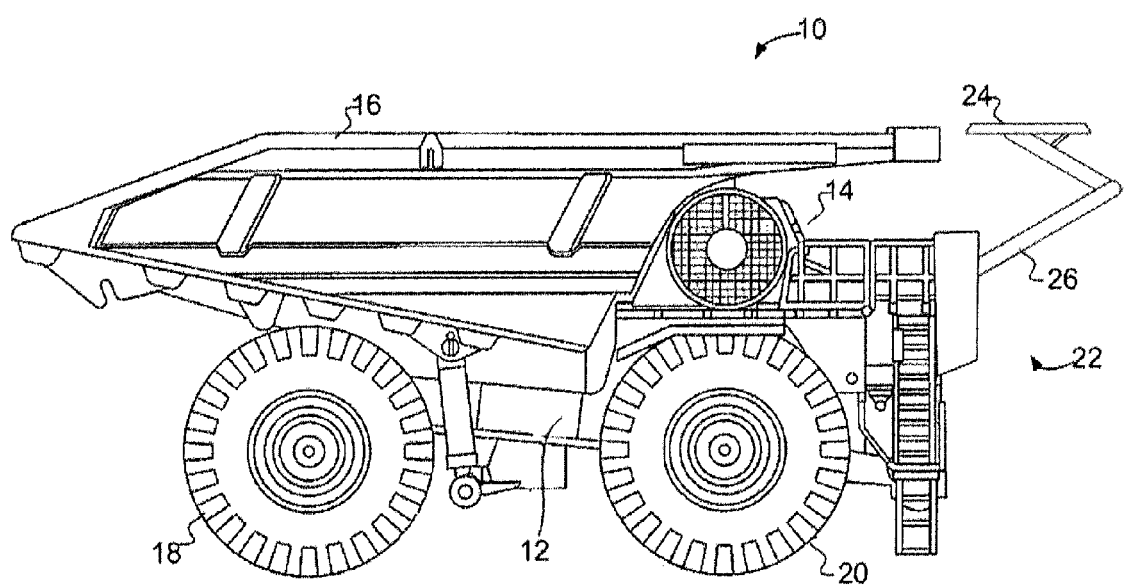
FIG. 1 is an illustration of a side view of a trolley-assisted off-highway truck within which an embodiment of the disclosed principles may be implemented.

Referring now to FIG. 1, this figure shows a side view of a trolley-assisted off-highway truck 10 within which an embodiment of the disclosed principles may be implemented. The off-highway truck 10 includes a chassis 12 that supports an operator cab 14 and a bucket 16. The bucket 16 is pivotally connected to the chassis 12 and is arranged to carry a payload when the off-highway truck 10 is in service. For non-automated operations, an operator occupying the operator cab 14 can control the motion and the various functions of the off-highway truck 10.

The chassis 12 supports various drive system components. These drive system components are capable of driving a set of drive wheels 18 to propel the off-highway truck 10. A set of idle wheels 20, optionally powered, can steer using known methods such that the off-highway truck 10 can be directed. In one embodiment, the drive wheels 18 are arranged at the rear of the chassis 12 and the idle wheels 20 are arranged at the front of the chassis 12. Even though the off-highway truck 10 includes a rigid chassis with powered wheels for motion and steerable wheels for steering, it will be appreciated that other machine configurations can be used. For example, such configurations may include an articulated chassis and/or a chassis supporting a plurality of driven wheel sets.

The off-highway truck 10 includes a self-contained power source such as an engine and fuel and/or electric motor and battery. In this way, the off-highway truck 10 may be self-powered in environments where an external power source is not available. Often however, it is more efficient to make use of external power such as from a trolley-line when available.

To this end, the off-highway truck 10 further includes a mechanism for receiving power from a trolley line. In particular, the off-highway truck 10 includes a selectively controllable pantograph 22. The pantograph 22 includes a plurality of contacts 24 (one visible in this view), each being supported by an associated articulated raising mechanism 26. During non-automated operations, the operator controls the raising mechanism 26 from within the operator cab 14, such that when there is no trolley line overhead, or it is not desired to use trolley power, the pantograph 22 remains lowered (as shown), and when there is a trolley line overhead and it is desired to use trolley power, the pantograph 22 is raised such that the plurality of contacts 24 come into contact with the conductors of the trolley line. During automated operation, these functions are executed by a controller as will be discussed in greater detail later.

As noted above, the off-highway truck 10 is controllable in speed, direction, and electrical connectivity to the trolley line to accomplish a task. However, the continued accurate manipulation of speed, steering and pantograph controls by the operator may result in operator fatigue, both physical and mental. To this end, in an embodiment, the off-highway truck 10 includes a controller for recording control sequences keyed to machine location and playing back these recorded sequences during an automated mode.

Figure 2:
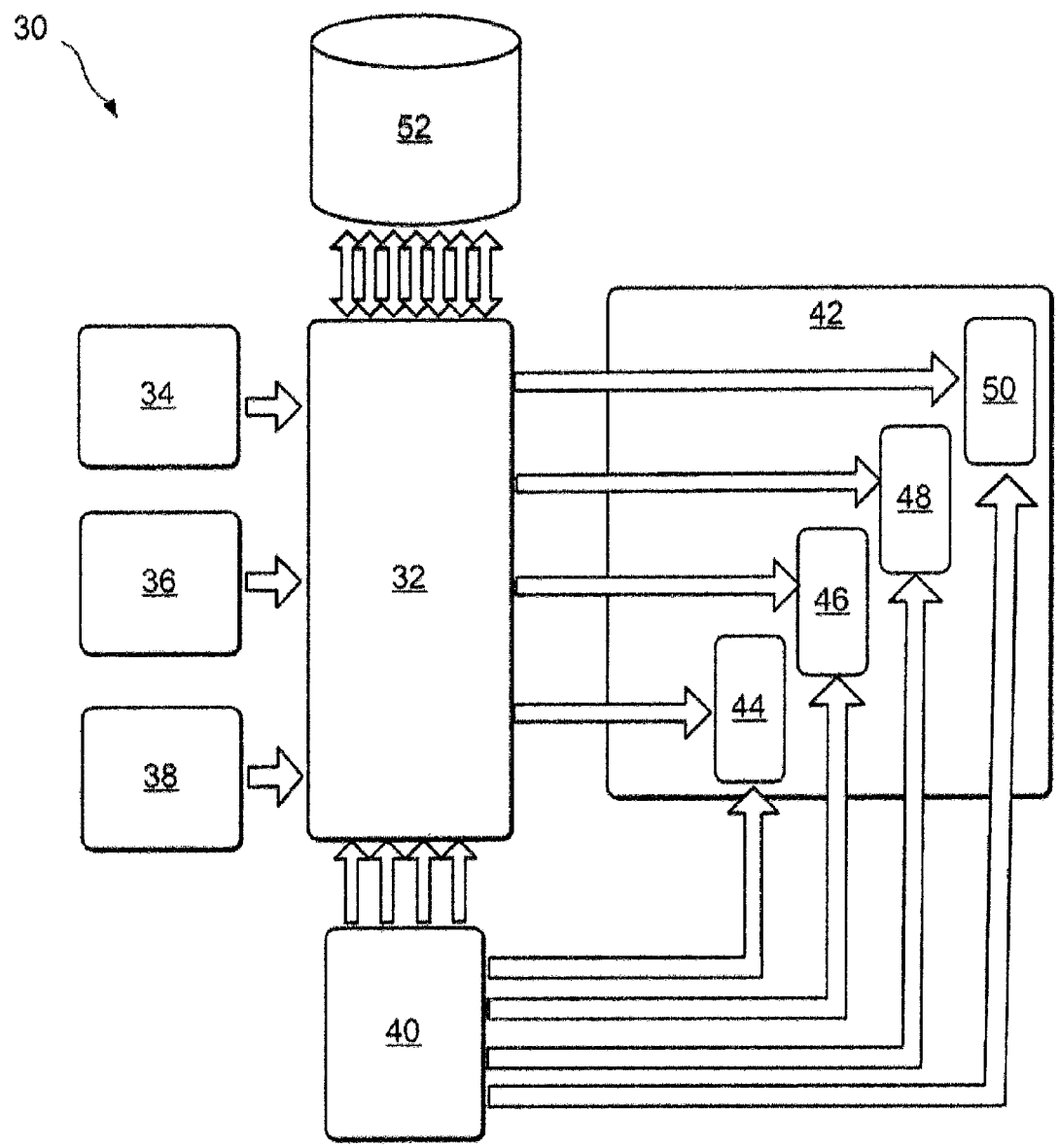
FIG. 2 is a schematic diagram showing a machine recording and control architecture in accordance with the disclosed principles.

In this connection, FIG. 2 is a schematic diagram showing a machine recording and control architecture 30 according to an embodiment. The illustrated architecture 30 is shown with elements associated with executing the functions disclosed in the present disclosure, however it will be appreciated that additional structures such as buffers, power sources and other items known to those of skill in the art are utilized to implement the disclosed architecture 30.

The architecture 30 includes a controller 32 for executing a number of functions including managing the storage of data and operator control inputs during recording and retrieving and replaying the recorded control inputs keyed to the recorded data during playback operation. The controller 32 may be a dedicated controller or may be embodied in an existing controller such as a machine controller, engine controller, power management controller, etc. In an embodiment, the controller 32 operates by reading computer-executable instructions, e.g., code or programs, from a non-transitory computer-readable medium, e.g., an optical or magnetic disc memory, CD, DVD, flash drive, etc., and executing those instructions. Data used by the controller 32 during execution may be retrieved from the computer-readable medium or from a peripheral source such as a user interface, machine sensors, etc.

In the illustrated embodiment, the controller 32 is connected and configured to interact with the machine 10 by receiving data via inputs and by outputting data and commands via outputs. The inputs shown include a location input from a location data system 34 such as a GPS location system or other system for specifying a location of the machine 10. Such other systems include dead reckoning systems, externally-references systems, and so on.

Further inputs to the controller 32 include an input for receiving selection data from a selector 36 for indicating an operator request to the system. For example, an operator may desire to record a route, play back a route, edit a route, and so on. The selector 36 may be a switch or other hardware element or may be a touch screen or other software-driven element. In an embodiment, the selector 36 is adapted to signal at least two modes including a record mode and a playback mode.

Yet another input is received from a machine sensor group 38 in an embodiment. Although any number and variety of sensors may be included in the sensor group 38, the sensor group according to an embodiment includes at least a steering sensor indicative of machine steering, e.g., from a wheel angle sensor, a machine speed sensor, and a pantograph position sensor indicative of the position of the pantograph, e.g., an up position so as to contact an overhead trolley line or a down position.

Moreover, a user interface group 40 provides a plurality of inputs to the controller 32 and to the machine actuator group 42. The plurality of inputs provided by the user interface group 40 include data indicative of machine operations executed by the operator in accomplishing a task, such as driving from a loading area to an unloading area. Similarly, the machine actuator group 42 includes the actuators that respond to the plurality of inputs provided by the user interface group 40.

Such inputs include, for example, a throttle or speed input, with the corresponding actuator group actuator being an engine controller 44 or transmission controller 46, or the like. Other inputs provided by the user interface group 40 include steering, e.g., via a joy stick or the like, with the associated actuator in the actuator group 40 being a hydraulic solenoid 48 linked to one or more hydraulic cylinders for steering the machine 10. One of the plurality of inputs is a pantograph command signaling a raising or lowering of the pantograph, with the associated pantograph actuator 50 being linked with a hydraulic cylinder or electric motor for performing the requested function.

In an embodiment, each data and user interface input provided to the controller 32 is stored in a playback database 52. The playback database 52 may be writeable electronic memory such as RAM, flash memory, hard disc memory, and so on. As user interface inputs are stored, coincident machine data is stored in associated memory. Thus, for example, the stored data may take the form of a table or listing wherein commands from the user interface 40 are stored in a linked manner with contemporaneous readings from the location data system 34 and machine sensor group 38. The selector 36 input need not be stored, but rather is used to command the controller 32 to operate in the specified mode.

Figure 3:
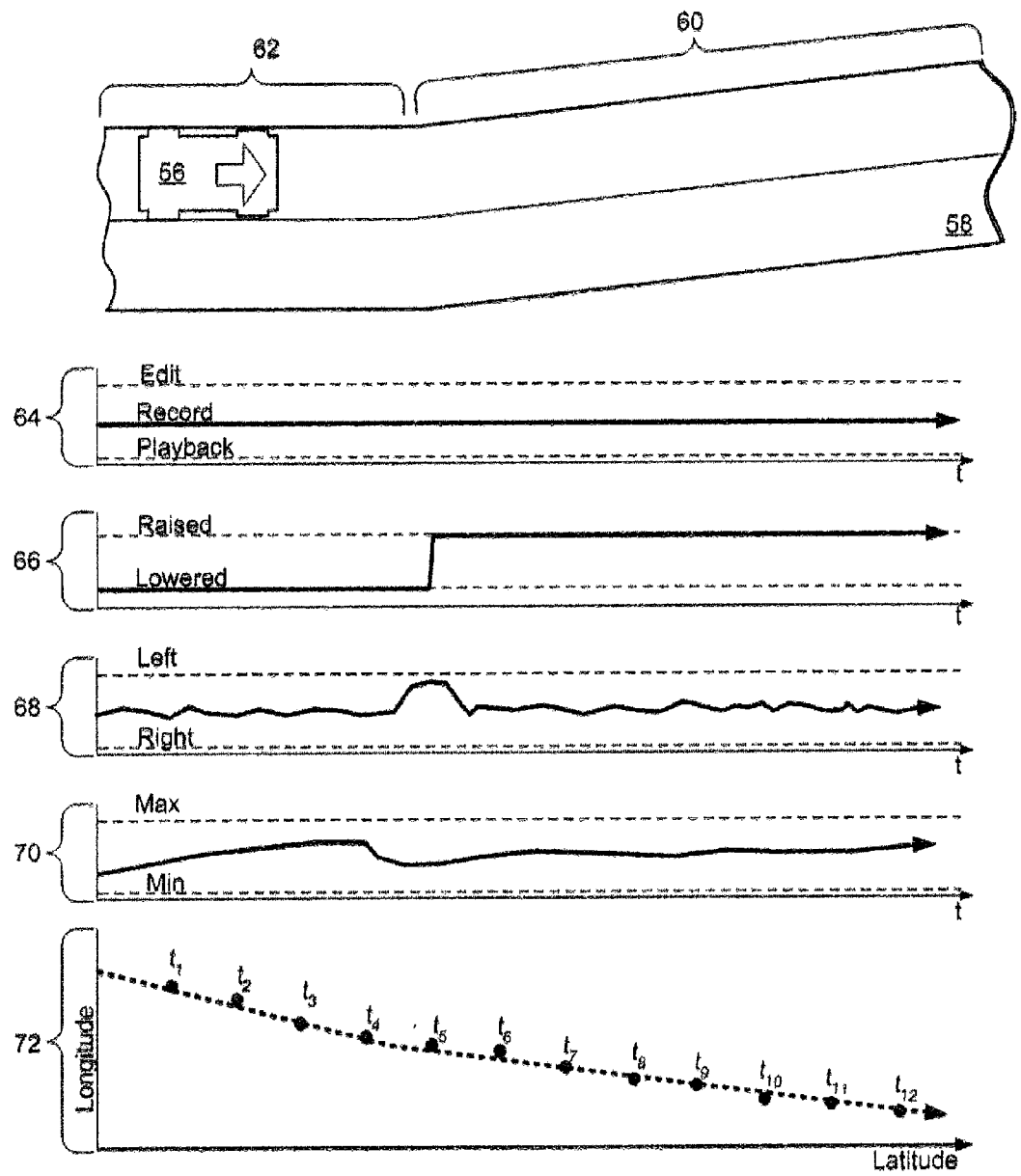
FIG. 3 is a timing diagram showing various data inputs and control inputs as an off-highway truck navigates a roadway while in record mode.

The timing diagram of FIG. 3 shows an example of various data inputs and control inputs as an off-highway truck 56 navigates a roadway 58 while in record mode. The roadway 58 includes a trolley-powered section 60 and a non-trolley-power section 62. Because the off-highway truck 56 is in record mode, the selector input value 64 is "record" and not "playback" or "edit." As the off-highway truck 56 navigates the non-trolley-power section 62, the pantograph position signal value is "lowered." When the off-highway truck 56 reaches the trolley-power section 60, the operator raises the pantograph, changing the pantograph position signal value 66 to "raised."

Similarly, the steering input value 68 is neutral during the non-trolley-powered section 62. When the turn to enter the trolley-powered section 60 is reached, the operator steers left and then returns the steering to neutral. As shown, the speed input value 70 decreases after the change in heading at the start of the trolley-powered section 60, e.g., in order to ensure steady contact, because an incline is encountered, or any other reason.

The location data 72 is three dimensional in that each time point (e.g., at each sampling interval) has two other dimensions (latitude and longitude) associated therewith. Thus, depending upon the roadway 58, the location data 72 may double back on itself unlike the other plotted data sets. In the illustrated example, the location data 72 shows the same angular change as the roadway 58, but rotated slightly overall. This is due to the fact that the roadway 58 of interest is not always aligned with a compass axis.

As noted above, the command data inputs are registered with their contemporaneous location data when stored to facilitate replications of machine state as the machine 10 reaches the registered location associated with that state. An exemplary data structure for storing machine data and location is shown in the data structure diagram of FIG. 4. The illustrated data structure 74 includes a time field 76 that designates the remaining entries to be linked together in each of a plurality of rows 84. Thus, for example, with respect to a given sample time $t_1$, a location latitude $x_1$ and location longitude $y_1$ in a location field 78 are linked to a pantograph state (up) in a pantograph state field 80 and a speed value $S_1$ in a speed field 82.

As noted above, the system can operate in a "Record" mode, an "Edit" mode, or a "Playback" mode. In addition, the system can be in an off or inactive mode to allow the machine 10 to be operated in an ordinary manual fashion. Further aspects and features of these various modes will be discussed hereinafter.

Figure 5:
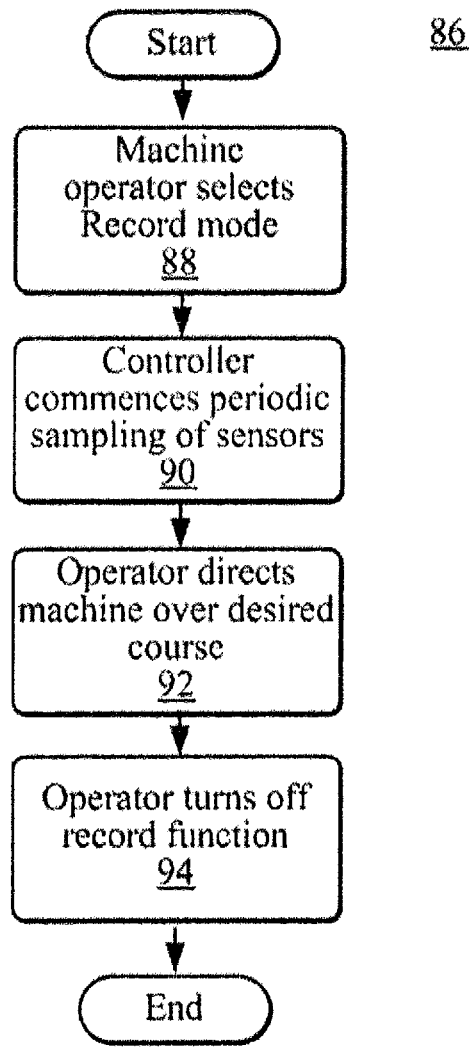
FIG. 5 is a flow chart illustrating a sequence recording process executed during a training period while a human operator manipulates a machine.

The flow chart of FIG. 5 illustrates a recording process 86 executed during a training period while a human operator manipulates the machine 10. At stage 88 of the process 86, the operator selects the Record mode of operation. Pursuant to this selection, the controller 32 commences periodic sampling of a plurality of sensors at stage 90 including a machine speed sensor, pantograph position sensor, and location sensor or system such as a GPS system or more generally the location data system 34.

As the operator directs the machine throughout the desired course at stage 92, including steering to stay on the roadway and under the trolley lines when available, raising and lowering the pantograph where appropriate, and controlling the machine speed, the controller 32 records the sampled data in the database 52. At stage 94, the operator turns off the record function, leaving the system in the off or inactive mode. However, the operator may recommence the record function whenever desired. For example, the operator may turn off the record function while circumnavigating a temporary blockage of the roadway.

With the database 52 containing one or more sequences of data readings associated with the desired course, the operator may elect to edit the data prior to playback. In an embodiment, the controller 32 presents a user interface to the operator to allow the operator to select any of the plurality of data sequences and make modifications, e.g., to alter the position where the pantograph is raised or lowered, to smooth out unnecessary waves in the path, to connect multiple adjacent sequences into a single sequence, and to introduce data by hand, e.g., to fill one or more gaps where the record function was turned off.

Figure 6:
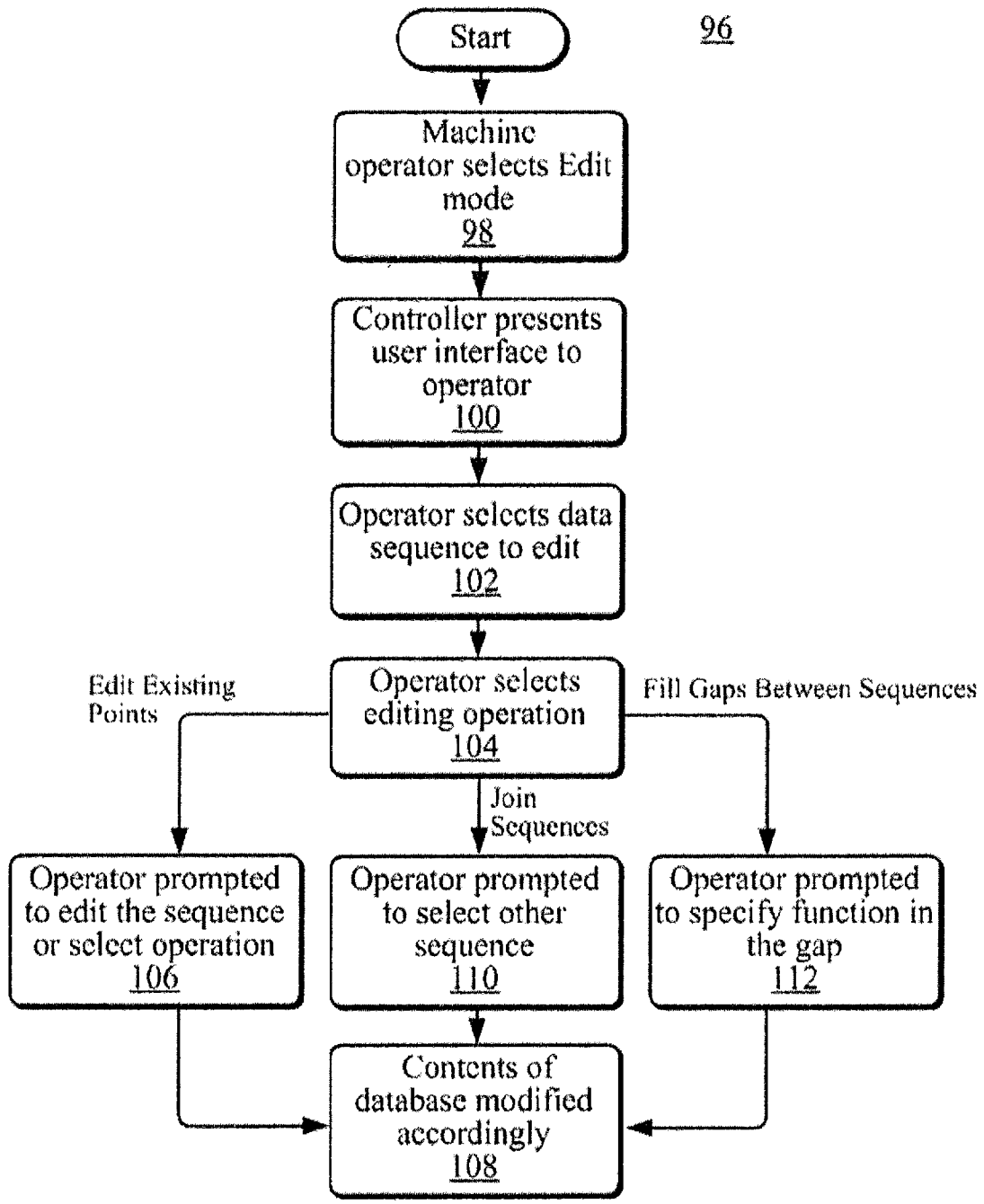
FIG. 6 is a flow chart illustrating a sequence editing process in keeping with an embodiment.

An exemplary editing process 96 is shown in FIG. 6. The process 96 assumes that the database 52 already contains at least one data sequence associated with the desired route. At stage 98, the operator selects the edit mode of operation, and in stage 100, the controller 32 presents a user interface to the operator as discussed above. The operator selects a data sequence to edit in stage 102, and then selects an editing operation in stage 104.

If the selected operation is to edit existing points of the sequence itself, the operator is directed at stage 106 to edit the sequence by entering data to replace existing data or to select an operation such as a smoothing operation, and the contents of the database 52 are modified accordingly at stage 108. If the selected operation is to join the selected sequence to another sequence, the operator is prompted to select the other sequence at stage 110, and the contents of the database 52 are modified accordingly at stage 108.

As noted above, the operator may also elect to fill in gaps between sequences to allow joining. If the operation selected at stage 102 is to fill such a gap, the controller 32 prompts the operator at stage 112 to specify the function in the gap, e.g., by a sequence of points to be interpolated, by drawing a line between adjacent endpoints, etc. After the action to fill the gap is executed by the operator, the contents of the database 52 are modified accordingly at stage 108.

Once any route sequences of interest have been recorded and edited as needed, they may be played back when desired by the same or a different operator during use of the machine 10. For example, a sequence recorded and edited by a veteran operator may be played back by a relatively inexperienced operator. In an embodiment, recorded sequences may be transferred to other machines, e.g., via a network link, portable flash drive or other media, etc.

Figure 7:
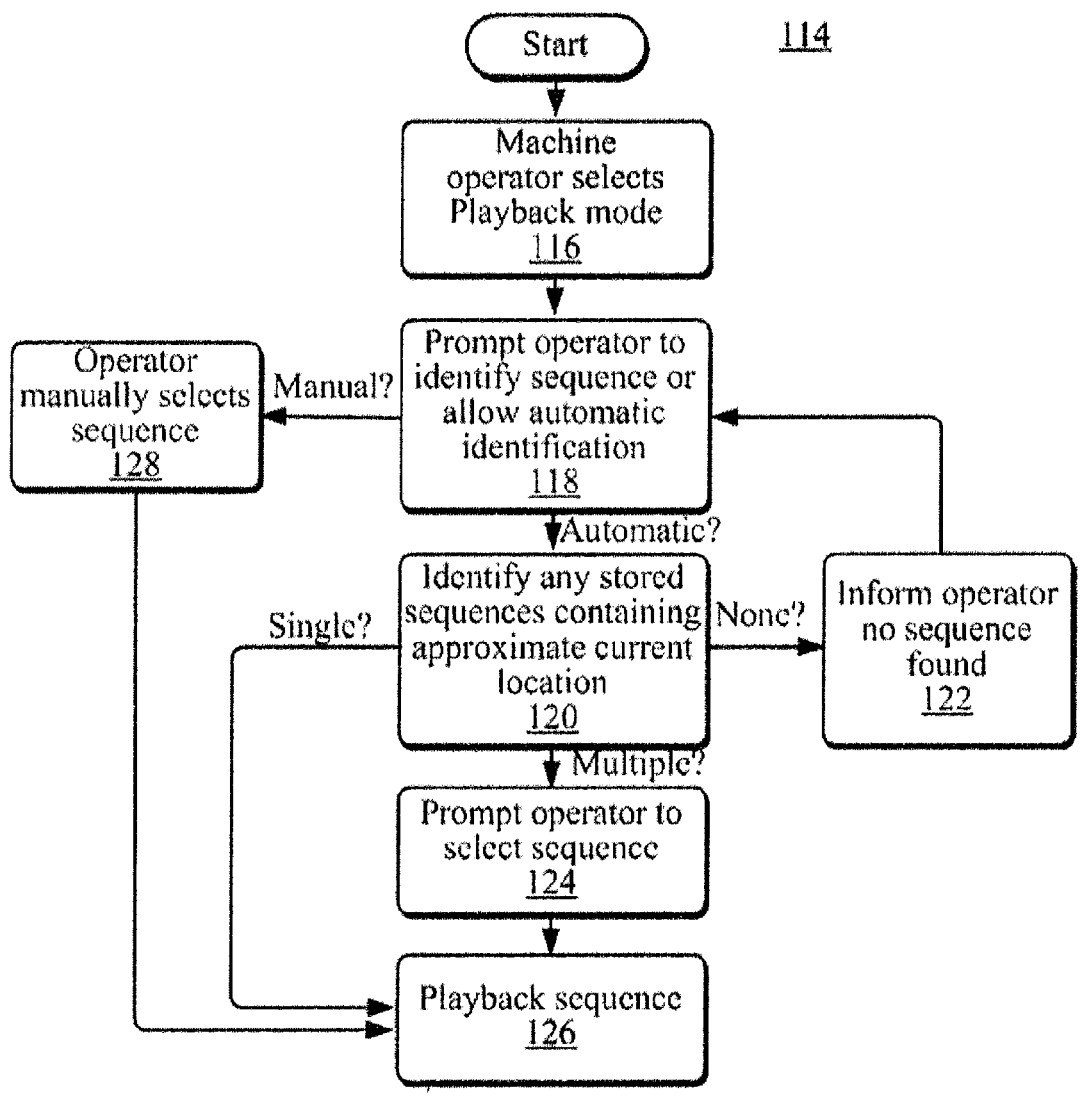
FIG. 7 is a flow chart illustrating a playback process in accordance with the disclosed principles.

An exemplary playback routine is shown in the process 114 of FIG. 7. Initially at stage 116, the operator selects the playback mode of operation. At stage 118, the operator is prompted to either identify a sequence or allow automatic sequence identification. If the operator elects an automatic identification, the controller 32 identifies all stored sequences containing the approximate current location, e.g., within a half width of the roadway, at stage 120.

If no such sequences exist, the operator is so informed at stage 122 and the process 114 returns to stage 118. If multiple such sequences exist, the operator is prompted at stage 124 to select the desired sequence from the plurality of sequences sharing the current location, and the process 114 then plays back the sequence at stage 126.

If a single matching sequence is identified at stage 120, or if the operator manually selects a sequence at stage 128, the process 114 moves directly to stage 124. During playback, the controller 32 takes over recorded inputs or inputs needed to track the sequence of interest, e.g., speed, steering (to maintain location in synch with sequence) and pantograph up/down.

While the foregoing process descriptions allow for operator intervention, it will be appreciated that a machine may alternatively be used autonomously, i.e., with no onboard operator, once it is trained. In such applications, it is desirable to incorporate a radio link or other remote link to remotely terminate the program and stop the machine and/or to include a collision avoidance module on the machine.

Industrial Applicability

In general, the present disclosure sets forth a system and method for providing automatic control of an off-highway truck and associated pantograph within a work site having one or more trolley-powered sections. A Record function prompts a controller to read and store machine location and state. Recorded sequences may be edited, concatenated, deleted, and so on via an Edit function. Finally, sequences may be played back, e.g., starting when the current machine location matches a location point in a recorded sequence.

During playback in an automatic mode wherein a human operator is present in the machine, the operator may interrupt playback, e.g., to make a temporary stop, avoid an obstacle that was not present during sequence recording, etc. In an autonomous mode wherein there is no human operator present in the machine, the machine may be remotely stopped or may incorporate collision avoidance functionality.

It will be appreciated from the foregoing that the present disclosure provides an effective and efficient mechanism for relieving operator fatigue associated with guiding an entirely or partially trolley-powered off-highway truck. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for automatically guiding an off-highway truck having a pantograph over a route having at least one trolley-powered section, the method comprising:
   causing the off-highway truck to be operated over the route, including raising the pantograph to contact one or more trolley lines associated with the trolley-powered section and lowering the pantograph when the off-highway truck is still within the trolley-powered section;
   while the off-highway truck is operated over the route, electronically and periodically recording a current position of the off-highway truck and a state of the pantograph at each position to produce a recorded sequence; and
   retrieving the recorded sequence and automatically controlling the off-highway truck to sequentially match each position and each pantograph state at the associated position.

2. The method for automatically guiding an off-highway truck according to claim 1, wherein the off-highway truck is unmanned during the step of automatically controlling the truck to sequentially match each position and to match each pantograph state at the associated position.

3. The method for automatically guiding an off-highway truck according to claim 1, wherein the off-highway truck is manned by a human operator during the step of automatically controlling the off-highway truck to sequentially match each position and to match each pantograph state at the associated position.

4. The method for automatically guiding an off-highway truck according to claim 1, wherein the step of electronically and periodically recording a current position of the off-highway truck and a state of the pantograph at each position to produce a recorded sequence also includes electronically and periodically recording a current speed of the off-highway truck in the recorded sequence.

5. The method for automatically guiding an off-highway truck according to claim 4, wherein retrieving the recorded sequence and automatically controlling the truck to sequentially match each position and each pantograph state includes controlling the off-highway truck to sequentially match each speed in the recorded sequence.

6. The method for automatically guiding an off-highway truck according to claim 1, further comprising modifying the recorded sequence prior to automatically controlling the off-highway truck.

7. The method for automatically guiding an off-highway truck according to claim 6, wherein modifying the recorded sequence includes smoothing the position of the off-highway truck in the recorded sequence.

8. The method for automatically guiding an Off-highway truck according to claim 7, wherein modifying the recorded sequence includes concatenating the recorded sequence with another sequence.

9. The method for automatically guiding an off-highway truck according to claim 1, further comprising determining that a current position of the off-highway truck substantially matches a position in the recorded sequence prior to automatically controlling the off-highway truck.

10. The method for automatically guiding an off-highway truck according to claim 1, further comprising ceasing automatically controlling the off-highway truck prior to finishing the recorded sequence based on an operator command.

11. The method for automatically guiding an off-highway truck according to claim 1, further comprising ceasing automatically controlling the truck prior to finishing the recorded sequence based on a remote termination command.

12. The method for automatically guiding an off-highway truck according to claim 1, further comprising detecting an imminent collision of the off-highway truck with an object and ceasing automatically controlling the off-highway truck in response to detecting the imminent collision.

13. The method for automatically guiding an off-highway truck according to claim 1, wherein the recorded position includes latitude and longitude locations.

14. A system for automatically guiding an off-highway truck over a route, the off-highway truck having a pantograph, the route having at least one trolley-powered section, the system comprising:
   a pantograph actuator for raising and lowering the pantograph;
   a steering actuator for steering the off-highway truck; and
   a controller configured to record a sequence of data including periodic position data and periodic pantograph state data while the off-highway truck is operated over the route by a human operator, and to automatically control the off-highway truck in keeping with the recorded sequence of data via the pantograph actuator and the steering actuator.

15. The system for automatically guiding an off-highway truck over a route according to claim 14, wherein the controller is further configured to periodically record a current speed of the off-highway truck in the recorded sequence.

16. The system for automatically guiding an off-highway truck over a route according to claim 14, wherein the controller is further configured to modify the recorded sequence prior to automatically controlling the truck.

17. The system for automatically guiding an off-highway truck over a route according to claim 16, wherein modifying the recorded sequence prior to automatically controlling the truck includes at least one of smoothing the position of the off-highway truck in the recorded sequence and concatenating the recorded sequence with another sequence.

18. The system for automatically guiding an off-highway truck over a route according to claim 14, wherein the controller is further configured to cease automatically controlling the off-highway truck prior to finishing the recorded sequence based on one of an operator command and a remote termination command.

19. A method for automating operation of an off-highway truck over a route having a trolley-powered section, the off-highway truck including a pantograph for drawing power to power the off-highway truck from one or more trolley lines associated with the trolley-powered section of the route, the method comprising:
   receiving a record command from an operator of the off-highway truck and in response to receiving the record command, recording a sequence of positions and pantograph states of the off-highway truck while the operator drives the off-highway truck and operates the pantograph over the route; and
   playing back the recorded positions and pantograph states to automatically operate the off-highway truck over the route.

20. The method for automating operation of an off-highway truck according to claim 19, wherein recording the sequence of positions and pantograph states comprises writing the sequence into a database associated with a controller on the of-highway truck.

21. The method for automating operation of an off-highway truck according to claim 19, wherein the off-highway truck is unmanned during the step of playing back the recorded positions and pantograph states.

* * * * *